F. W. MATZ.
LEVER MECHANISM FOR VEHICLE BRAKES.
APPLICATION FILED FEB. 12, 1918.

1,271,595.

Patented July 9, 1918.

WITNESSES
W. E. Fielding
S. M. McColl

INVENTOR
Frederick W. Matz.

BY Richard Owen

ATTORNEY

UNITED STATES PATENT OFFICE.

FREDERICK W. MATZ, OF VALLEY CITY, NORTH DAKOTA.

LEVER MECHANISM FOR VEHICLE-BRAKES.

1,271,595.      Specification of Letters Patent.      Patented July 9, 1918.

Application filed February 12, 1918. Serial No. 216,769.

*To all whom it may concern:*

Be it known that I, FREDERICK W. MATZ, a citizen of the United States, residing at Valley City, in the county of Barnes and State of North Dakota, have invented certain new and useful Improvements in Lever Mechanism for Vehicle-Brakes, of which the following is a specification.

This invention relates to vehicle brakes, and more particularly to emergency brakes for automobiles.

The primary object of this invention is to provide improved means for actuating the wheel brakes of automobiles or power driven vehicles which drive their traction wheels through differential gear mechanism.

In this class of machines, it is well known that if one traction wheel happens to stand on a slippery spot it will tend to whirl at excessive speed and the driving energy will be rendered ineffective to propel the vehicle. In other words, a vehicle equipped with a differential driving gear will be properly propelled only when both wheels have good and approximately equal traction, and when the two wheels have not the same traction or frictional engagement with the ground, the driving force is always measured by the traction of the wheel that will first slip, and it is to overcome these objections that this invention is designed.

The object of the invention is to so construct, mount, and connect a brake lever of this character that it may be manipulated to apply either brake independently of the other or to set both simultaneously.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
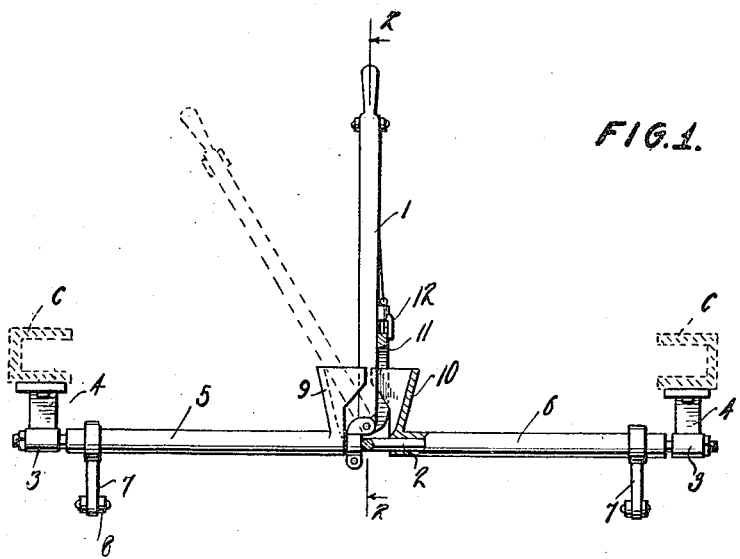
Figure 2:
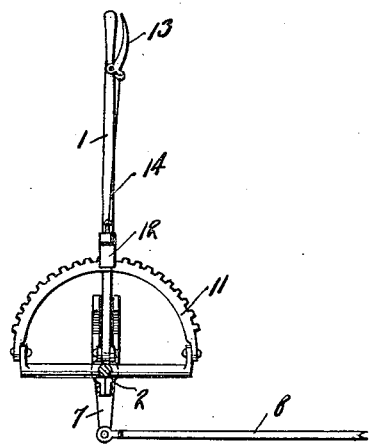

Figure 1 represents a front elevation of an emergency brake lever and its connected parts, said lever being shown in full lines, set for actuating both brakes simultaneously, and in dotted lines for actuating one of them independently of the other, parts being in section, and Fig. 2 is a vertical section taken on the line 2—2 of Fig. 1.

In the embodiment illustrated a brake lever 1 is shown fulcrumed on a rod or shaft 2 which is rotatably mounted in bearings 3 carried by brackets 4 fixed to the chassis C of a vehicle.

Mounted for rotation on the shaft 2 are a pair of sleeves 5 and 6 arranged on opposite sides of the lever 1 and having their inner ends spaced therefrom. Brake rod draw arms 7 are fixed to these sleeves, being here shown arranged near the outer ends thereof and which are connected with the brake rods as 8, said rods being designed for connection with the usual brakes, not shown.

Carried by the inner ends of the sleeves 5 and 6 are upstanding substantially semi-circular castings 9 and 10 which normally have their adjacent edges spaced a sufficient distance to permit the rotation of one of the sleeves 5 independently of the other and yet close enough together to permit both of the castings to be engaged by the lever 1, when set in central position as shown in full lines in Fig. 1. When this lever is so set, it will be obvious that a backward or forward movement thereof will operate to turn both of the sleeves 5 and 6 and thereby simultaneously actuate the brake connected with the rods 8. When the lever 1 is shifted to the left into the dotted line position shown in Fig. 1, it will engage the casting 9 only and consequently when the lever is moved back or forth, the sleeve 5 only will rotate and thereby operate the brake which it controls, the other brake remaining inoperative during this movement. It is of course understood to operate the other brake independently, the lever 1 will be shifted toward the right to cause it to engage the casting 10 only.

A semi-circular toothed rack 11 is mounted in convenient position to be engaged by a spring pressed dog 12 carried by the lever 1 so that when said lever is adjusted it may be locked in such position by the dog springing into engagement with the teeth of the rack. It being well understood that to release the lever, all that is necessary is to compress the handle 13 which is connected with the dog by the connection 14 in a manner commonly used in devices of this character.

By constructing this device so that the lever 1 may be actuated to operate one or the other of the brakes independently, a great advantage will be obtained in that should one of the rear wheels of the vehicle spin in the mud and the other having a solid footing, the brake lever may be positioned so as to set the brake on the side to which the wheel is spinning, just a sufficient distance to prevent the turning of the wheel, so that it becomes a base of re-action whereby all of the driving force is transmitted to the other wheel which has a solid footing to draw the vehicle out and propel it forward.

This arrangement is also especially useful should a vehicle skid, for instance, should the driver desire to turn toward the left, and the front wheels of the vehicle slide straight ahead, the left brake can be slightly set and the wheel in connection with which it is used will exert a pull backward on the car, and the right rear wheel will pull forcibly forward thereby enabling the car to turn a corner.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. The combination with a pair of brake actuating rods, a lever for controlling said rods mounted to swing in planes at right angles to each other, rotatably mounted longitudinally alined members connected with said rods and having upstanding elements positioned in the path of movement of said lever whereby the lever may be engaged with one or the other of said elements, to actuate one of the brakes independently of the other or with both of them to actuate the brakes simultaneously.

2. The combination with a supporting structure, a shaft rotatably mounted therein, a lever fulcrumed on said shaft to swing in planes at right angles to each other, longitudinally alined sleeves rotatably mounted on said shaft on opposite sides of said lever and having upstanding elements at their inner ends positioned in the path of the lever, brake bar arms secured to said sleeves, brake rods connected with said arms, said lever being operable to engage one or the other of said upstanding elements or both of them at the will of the operator whereby one brake may be actuated independently of the other or both simultaneously actuated.

3. The combination with a supporting structure, of a shaft rotatably mounted in said structure, a lever fulcrumed on said shaft to be moved back and forth and laterally, sleeves carried by said shaft on opposite sides of said lever, semi-circular castings rising from the inner ends of said sleeves and encompassing said lever, the opposite faces of said castings being spaced slightly apart to permit one sleeve to be rotated independently of the other when its respective casting is engaged by the lever, and brake rods connected with said sleeves and adapted to be actuated by the turning of the sleeves.

4. The combination with a vehicle chassis having transversely spaced and alined bearings; of a shaft rotatable within said bearings, a lever fulcrumed on said shaft midway its ends, rotatable sleeves on said shaft on opposite sides of said lever and having their inner ends spaced from the lever, brake rod draw arms fixed to said sleeves, brake rods connected with said arms, upstanding semi-circular castings carried by the inner ends of said sleeves with their adjacent edges spaced a sufficient distance to permit the rotation of one sleeve independently of the other, and yet close enough to permit both castings to be engaged by the lever when set in central position.

In testimony whereof I affix my signature in presence of two witnesses.

FREDERICK W. MATZ.

Witnesses:
JAMES W. NIELSON,
F. L. LOOMIS.